United States Patent [19]
Elze et al.

[11] Patent Number: 5,660,512
[45] Date of Patent: Aug. 26, 1997

[54] APPARATUS TO PROTECT PERISHABLE PRODUCTS DURING TRANSPORT

[76] Inventors: Helmut Richard Elze, 2 Porto Marino Ln., San Carlos, Calif. 94070; Olaf Diehrich Elze, 2026 Broderick St., San Francisco, Calif. 94115

[21] Appl. No.: 583,992

[22] Filed: Jan. 11, 1996

[51] Int. Cl.$^6$ ............................................. B61D 45/00
[52] U.S. Cl. ..................... 410/124; 410/121; 410/143
[58] Field of Search ................................ 410/119, 121, 410/122, 123, 124, 125, 127, 128, 153, 155, 156, 143, 145

[56] References Cited

U.S. PATENT DOCUMENTS

| | | | |
|---|---|---|---|
| 1,533,695 | 4/1925 | Conlon et al. | 410/123 |
| 2,974,931 | 3/1961 | Reel et al. | 410/128 |
| 3,605,638 | 9/1971 | James | 105/369 B |
| 4,040,526 | 8/1977 | Baxter | 214/10.5 |
| 4,145,973 | 3/1979 | Baxter | 105/468 |
| 4,236,854 | 12/1980 | Rogers | 410/121 |
| 4,366,377 | 12/1982 | Davis | 296/24 |
| 4,473,331 | 9/1984 | Wisecarver | 410/129 |
| 4,553,887 | 11/1985 | Reeves | 410/119 |
| 4,591,459 | 5/1986 | Liebel | 428/35 |
| 5,011,350 | 4/1991 | Brock | 410/122 |
| 5,042,663 | 8/1991 | Heinrich | 206/522 |
| 5,181,815 | 1/1993 | Hobercorn | 410/140 |
| 5,288,188 | 2/1994 | Vance | 410/119 |
| 5,372,396 | 12/1994 | Van Nahmen | 296/39.2 |
| 5,437,301 | 8/1995 | Ramsey | 137/231 |

FOREIGN PATENT DOCUMENTS 1052586   12/1966   United Kingdom ................. 410/119

Primary Examiner—Karen B. Merritt
Assistant Examiner—Gregory A. Morse
Attorney, Agent, or Firm—Robert Samuel Smith

[57] ABSTRACT

An apparatus for securing cargo during transport in a cargo hold wherein the cargo is centerloaded to provide adequate air circualtion and to distribute the weight. Centerloading leaves small voids and large voids between the walls of the cargo space and the walls of the cargo space. Inflatable deflatable bags are placed in the small voids and expandable braces are also positioned in the larger voids. The braces feature two blocks, one block on the end of a threaded shaft opposite the other block. A speed nut on the threaded shaft is turned to adjust the position of between the two blocks. The bags are flexible plastic with a valve for admitting air into the bag and a separate cap for releasing the air conveniently and quickly.

6 Claims, 2 Drawing Sheets

APPARATUS TO PROTECT PERISHABLE PRODUCTS DURING TRANSPORT

BACKGROUND AND INFORMATION DISCLOSURE

In the transportation of perishable products such as fruits and vegetables, the produce is normally packed onto pallets and which are then placed in the cargo space of a refrigerated enclosure such as a truck trailer or container. Studies show that, even though the cargo units are refrigerated, outside weather conditions can produce adverse effects on the cargo. These studies show that produce in direct contact with the walls of the cargo space is prone to damage and/or shorter shelf life. It is therefore desirable for none of the cargo to be in contact with the walls of the cargo space which act as a conductor for outside weather conditions. Hence, the practice of "centerloading" was developed which in the transporting of such produce refers to placing the cargo in the center of the cargo space, thus leaving a space between between the walls of the cargo space and the cargo and in so doing allowing for maximum refrigerated air circulation. After placing the cargo in the cargo space, it is thus necessary to support the cargo in the cargo space to prevent damage to the produce due to heating or freezing if the cargo comes into into contact with the walls of the cargo space and/or the shifting of the cargo during transportation.

"Dunnage bags", large inflatable bags often made of paper with an air tight plastic liner, have been used to prevent the movement of cargo during transportation. These bags are placed in the voids between the cargo and the walls of the cargo and then inflated. When the cargo arrives at its destination and prior to unloading, the bags are punctured and discarded. Applying the concept of centerloading, however, leaves more voids as there needs to be a space between all of the cargo and all of the walls of the cargo space. Thus, more dunnage bags are needed resulting in a drastic increase in shipping costs.

U.S. Pat. No. 4,591,519 to Liebel discloses an airbag for bracing made of a stiff paperboard having good vertical stiffness when uninflated.

U.S. Pat. No. 5,042,663 to Heinrick discloses joinable inflatable bladders for packaging.

U.S. Pat. No. 5,288,188 to Vanes discloses a dunnage bag constructed of welded rectangular sheets.

U.S. Pat. No. 4,553,887 to Reeves discloses a dunnage bag made of triangular sheets of kraft paper lined with polyethylene.

U.S. Pat. No. 4,040,526 to Baxter et al discloses a dunnage bag including a bladder and reinforcing sheets enclosing the bladder.

U.S. Pat. No. 4,145,973 to Baxter discloses a dunnage bag provided with an adhesive strip for attaching the uninflated bag to the surface against which it will bear when inflated.

U.S. Pat. No. 4,366,977 to Davis et al discloses a partition for dividing the compartment of a cargo transporter and made of tube sections.

U.S. Pat. No. 5,372,396 to Nahmen discloses a cargo bed liner with side panels pivotally attached.

U.S. Pat. No. 5,437,301 to Ramsey discloses a valve especially adapted for use with dunnage bags having an actuator which, in one position is spring loaded to permit entry but not escape of compressed air into the bag for inflation and is rotatable to another position where it permits air to escape to deflate the bag.

The bags disclosed in the prior art do no ameliorate problems associated with centerloading cargo in that some of the voids created by centerloading are so large that the cost of a bag filling the large void would be excessive.

The practice of puncturing a disposable bag to release air after use was adopted as being more cost effective than use of bags disclosed in the prior art in terms of the cost of the bag and the convenience in releasing the air quickly after use. None of the valves disclosed in the cited art presently used to admit air into the bags provide for fast release of the air.

Rigid collapsible braces have been disclosed for supporting cargo in cargo space. For example, U.S. Pat. No. 4,236,854 discloses a brace having side rails and extensible side arms.

U.S. Pat. No. 4,473,331 to Wisecarver discloses a foot assembly and extensible element with lever locking member.

U.S. Pat. No. 5,181,815 to Haberkorn discloses a collapsible bracing structure and rotatable latches for releasing.

U.S. Pat. No. 3,665,638 to James discloses a load brace with selectable fixed positions.

None of the disclosed braces provide the convenience of use, versatility of application, and economy of construction of the brace of the present invention.

SUMMARY OF THE INVENTION

In view of the limitations associated with procedures and devices of the prior art, it is an object of this invention to provide a combination of expandable braces and reusable bags for conveniently and economically supporting cargo arranged in a "centerloading" configuration. "Centerloading" is understood to mean in the context of this application cartons supported on pallets in which some of the pallets are arranged in pairs and other panels are arranged singly. Each pair of pallets are arranged abreast of and against one another between the opposing walls of the cargo space so that a small void is left between one pallet and an adjacent wall opposite a small void between the opposite wall and the other pallet. Each single pallet is located such that there is a large void between the single pallet and the wall on both sides of the pallet. The practice of "centerloading" is commonly followed not only to provide adequate air circulation but also to distribute the weight of the cargo evenly throughout the cargo space.

The bags are installed in the relatively small voids between the cargo and walls of the cargo space such as the voids created by pallets arranged "two abreast" between the walls of a truck trailer. The use of bags in these small spaces not only act as supports in the close spacing such as to prevent damage to the produce in transit but also minimizes heat conduction from outside of the walls of the cargo space. Each bag is made of durable, flexible plastic which is selected such that the bag will expand or contract without rupturing when subject to altitude or temperature changes. Each bag has an inlet needle valve which is an economic valve convenient for admitting air into the bag from a pneumatic pump and a separate nipple with a cap wherein the nipple is large enough such that, when the cap is removed, the air is expelled very quickly allowing quick and convenient deflation of the bag prior to unloading the cargo.

The braces are installed in place of bags across relatively large voids between the cargo and walls of the cargo space. Such voids are created by a single pallet located between opposing walls of a truck trailer where the use of a large bag would be prohibitive because of the cost of a large bag. In the shipping of some fruit, every fourth pallet is arranged singly across the space between cargo walls in order to distribute the weight of the load. Therefore the use of a brace that is considerably less expensive than the bag reduces cost substantially. Each brace comprises two blocks supported distal from one another by a threaded shaft that has one end secured to one block and another end slidably positioned in a hole in the second block. A rotatable nut is captured in the second block and engages the second end of the threaded shaft so that distance between the two blocks is adjustable by turning the nut. The nut and bar have flats on the threads which permit rapid adjustment of the space between the blocks.

DESCRIPTION OF PREFERRED EMBODIMENTS

Figure 1:
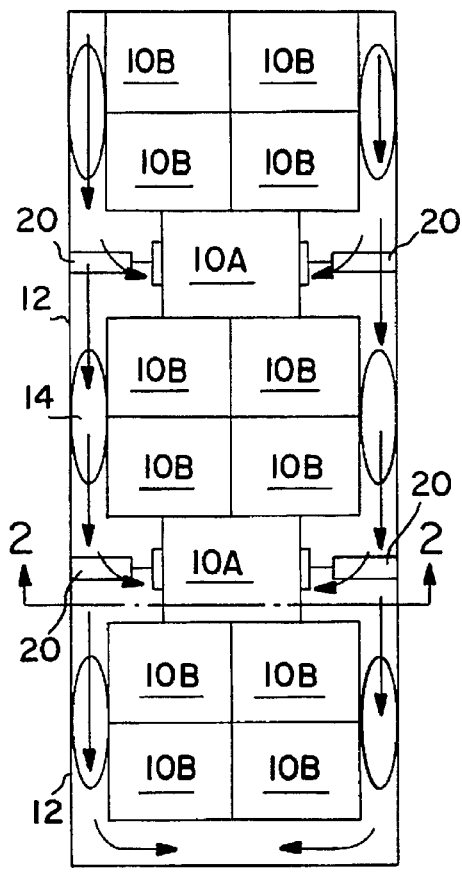
FIG. 1 shows a top view of pallets center loaded and secured by the invention.
Figure 2:
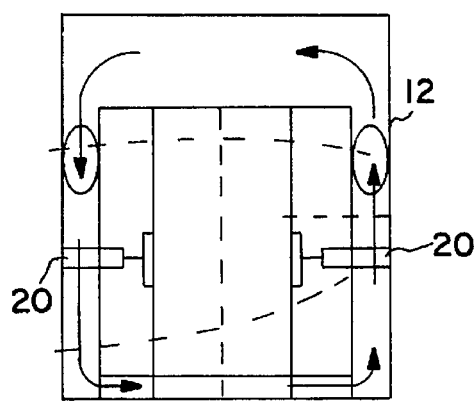
FIG. 2 shows a view of FIG. 1 along line of sight 2—2.

Turning now to a discussion of the drawings, FIG. 1 is a top view of pallets 10A, 10B (fourteen are shown) arranged in a "centerload" configuration between walls 12 of the cargo space. The pallets 10 are standard size, 42 inches by 42 inches. FIG. 2 is an end view of FIG. 1 taken along line of sight 2 in FIG. 1. Arrows indicate a flow pattern of refrigerated air. Narrow voids between walls of the truck trailer and cartons on pallets arranged two abreast are occupied by the inflatable air bags 14. Expandable braces 20 are installed in voids between the trailer walls and a single pallet 10A.

Figure 3:
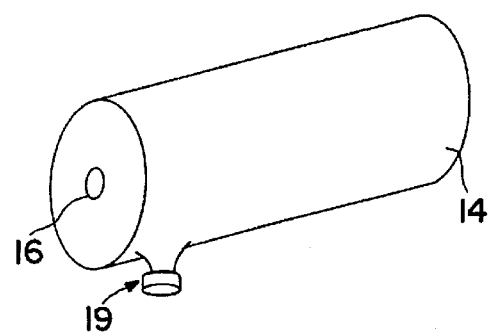
FIG. 3 shows an air bag of the invention.

FIG. 3 shows each bag 14 as being an elongated inflatable reusable sleeve made of durable flexible plastic and featuring an inflation valve 16 in one end of the bag 1. An air release 19 permits rapid deflation of the sleeve when the cargo reaches its destination.

Figure 4:
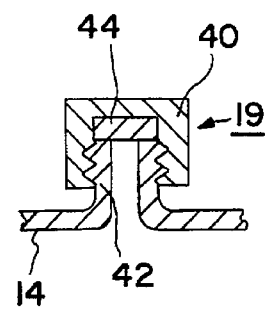
FIG. 4 shows details of the air release.

FIG. 4 shows details of the air release 19 including a threaded nipple 42 extending away from the bag 14 with a cap 40 screwed down on the nipple 42 and pressing a sealing plug 44 to close off the nipple opening. It is a feature of this invention to construct and design the air release to be separate from the air inlet needle valve 16 to make the air release large enough so as to be able to conveniently and rapidly release the air simply by unscrewing the cap 40.

Figure 5:
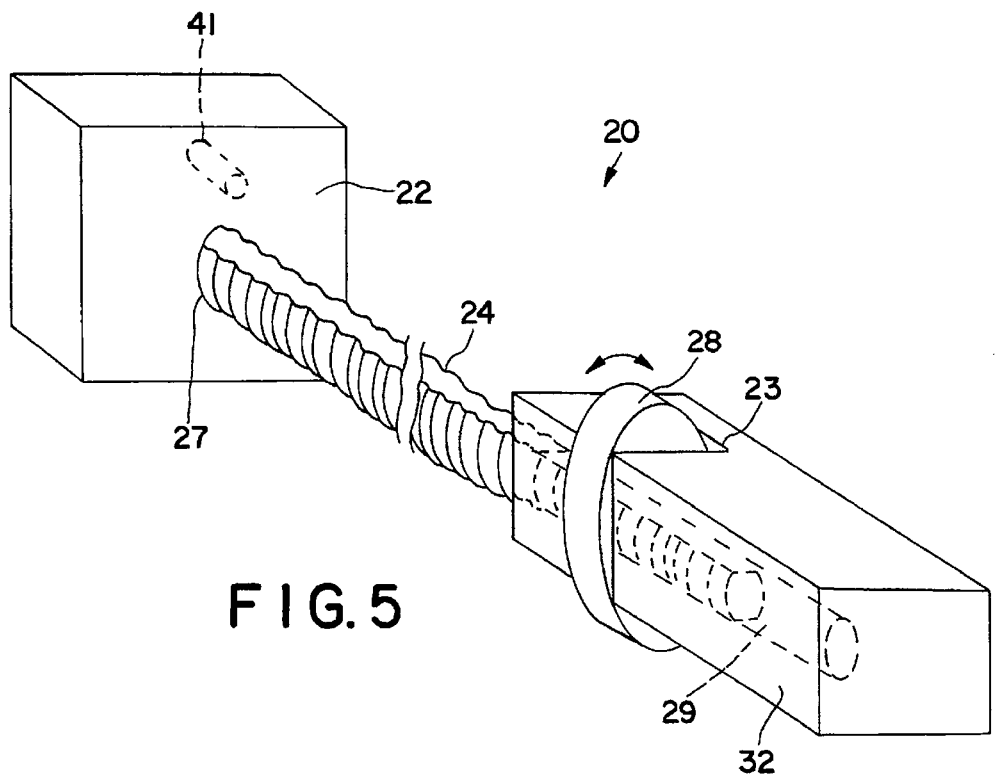
FIG. 5 shows details of the expandable brace.
Figure 6:
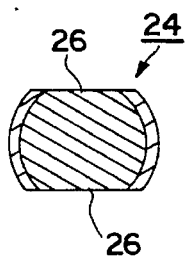
FIG. 6 is a sectional view of the threaded shaft.
Figure 7:
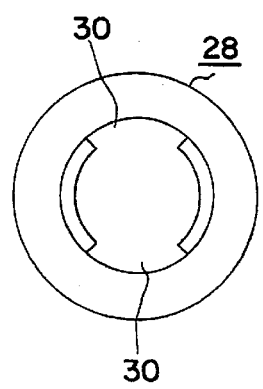
FIG. 7 is a sectional view of the nut.

FIG. 5 shows details of the expandable brace 20 including a first base end being a block 22 preferably wood, with a threaded hole 27 for securely receiving an end of a threaded shaft 24. The other end of the shaft 24 is slidably inserted into an elongated hole 29 in the surface of an elongated wooden second base 32. The second base 32 has a slot 23 for receiving a "speed" nut 28 which engages the threaded shaft 24 and maintains the shaft in a required location inside the second base 32. As shown in the sectional view of FIG. 6, the threaded shaft 24 has two flats 26 to accommodate "speed" nut 28. As shown in sectional view FIG. 7, the speed nut 28 also has two unthreaded sections 30 so that the nut 28 may be speedily positioned by sliding on the half threaded shaft 28 and then secured by a half turn of the nut 28.

A major feature of this invention is a method and apparatus for supporting cargo on pallets arranged in the center-loading configuration of FIG. 1. The brace construction is amenable to reaching in and tightening the brace when the brace is located in locations that are otherwise awkward to reach. Similarly, the deflated airbags are convenient to arrange prior to inflation and are quickly deflated after arrival at the destination. The bags are also durable and therefore reusable numerous times. These features provide clear advantages over the present state of the art bags which are punctured for quick air release and then thrown away.

Various arrangements and modifications may be suggested by reading the specification and studying the figs. that are within the scope of the invention. For example, the bags may be constructed from any one of a number of flexible cloth-like materials including polyethylene, polypropylene, polyvinyl chloride or polyurethane. We therefore wish to define the scope of our invention by the appended claims and in view of the specification if need be.

What is claimed is:

1. A method for supporting cargo center-loaded on a total plurality of pallets between opposing vertical walls of a cargo space and transporting said cargo to a location, said total plurality being equal to a first plurality of pallets plus a second plurality of pallets and in which said first plurality of pallets is arranged as single pallets beween said walls such as to create voids having a first size between said single pallets and said walls and said second plurality of pallets is arranged as pairs of pallets, each pallet of each pair being abreast of said other pallet of said pair leaving a plurality of voids having a second size between each said pair and and said walls, said first size being substantially larger than said second size and such as to substantially evenly distribute weight of said cargo throughout said cargo space, said method including the steps:

(a) providing a plurality of expandable braces, at least one said brace for each one of said first voids, wherein each said expandable brace comprises:

(i) a first block with a first surface and a second surface opposite said first surface of said first block;

(ii) a second block with a first surface having an elongated hole in said first surface of said second block and a second surface of said second block opposite said first surface of said second block;

(iii) a threaded shaft having one end secured to said first surface of said first block and extending away from said first surface of said first block;

(iv) said threaded shaft having another end slidably extending into said elongated hole in said first surface of said second block;

(v) a nut having a threaded hole;

(vi) said second block having a slot intermediate said first and second surfaces of said second block with said nut positioned in said slot such that said another end of said threaded shaft inserted into said elongated hole in said second block is threaded into said threaded hole in said nut and said another end of said threaded shaft is retained in said elongated hole;

(vii) said another end of said threaded shaft, nut and slot in said second block operably arranged to permit that a length of each said brace between said first and second blocks is adjustable by a user turning said nut;

(b) providing a plurality of flexible inflatable bags, at least one bag for each one of said second voids, each one of said inflatable bags having a valve means adapted for admitting air into said bag, an air release means proximal to said valve means for permitting air to escape from said bag, said air release means comprising:

(i) a threaded nipple having an orifice and formed in a wall of said bag;

(ii) said orifice such that an inside of said bag communicates with an outside of said bag;

(ii) a plug removably positioned on said orifice of said threaded nipple;

(iii) a cap screwed onto said threaded nipple and operably arranged with said plug and said nipple such that said plug is forced against and closes said orifice whereby a user is able to position each said bag into a respective one of said second voids when said bag is deflated and then inflate said bag through said valve means thereby securing said cargo positioned on one of said pairs of pallets and afterwards unscrew said plug and to release said plug and deflate said bag through said nipple of said air release means and remove said cargo;

(c) positioning said cargo center-loaded on said total plurality of pallets between opposing vertical walls of said cargo space, with said first plurality of pallets arranged as single pallets beween said walls such as to create said voids having said first size between said single pallets and said walls and said second plurality of pallets arranged as pairs of pallets, each pallet of each pair being abreast of said other pallet of said pair leaving a plurality of voids having said second size between each said pair of pallets and said walls such as to substantially evenly distribute weight of said cargo throughout said cargo space;

(d) positioning each said bag into a respective one of said second voids when said bag is deflated;

(e) inflating each said bag through said valve means thereby securing said cargo positioned on said second plurality of pallets;

(f) positioning each said expandable brace into a respective one of said first voids and expanding said length of each said brace against a respective one of said single pallets and said cargo wall, (g) locating said cargo in said destination;

(h) shortening each said expandable brace to permit removing said expandable brace from said respective first voids;

(j) unscrewing each said cap to deflate a respective bag and permit removing said respective bag from said respective second void.

2. An apparatus for supporting cargo center loaded on a total plurality of pallets between opposing vertical walls of a cargo space, said total plurality being equal to a first plurality plus a second plurality, and in which said first plurality of pallets are arranged as single pallets beween said walls such as to create voids having a first size between said single pallets and said walls and said second plurality of pallets are arranged as pairs of pallets, each pallet of each pair being abreast of said other pallet of said pair leaving voids having a second size between each said pair and said walls, said first size being substantially larger than said second size and such as to substantially evenly distribute weight of said cargo throughout said cargo space, said apparatus comprising:

a plurality of expandable braces, at least one said brace for each one of said first voids, each said expandable brace having:

(i) a first block with a first surface and a second surface opposite said first surface;

(ii) a second block with a first surface having an elongated hole in first surface of said second block and a second surface of said second block opposite said first surface of said second block;

(iii) a threaded shaft having one end secured to said first surface of said first block and extending away from said first surface of said first block;

(iv) said threaded shaft having another end slidably extending into said elongated hole in said first surface of said second block;

(v) a nut having a threaded hole;

(vi) said second block having a slot intermediate said first and second surfaces of said second block with said nut positioned in said slot such that said another end of said threaded shaft inserted into said elongated hole in said second block is threaded into said threaded hole in said nut whereby said another end of said threaded shaft is adjustably retained in said elongated hole and a distance between said first and second blocks is adjustable and permitting that each one of said plurality of expandable braces be positionable in said one of said plurality voids having a first size such as to maintain position of said cargo on pallets between said walls of said cargo space;

a plurality of flexible inflatable bags, at least one bag for each one of said second voids, each one of said inflatable bags having a valve means adapted for admitting air into said bag, an air release means proximal to said valve means for permitting air to escape from said bag, said air release means having:

(i) a threaded nipple having an orifice and formed in a wall of said bag;

(ii) said orifice such that an inside of said bag communicates with an outside of said bag;

(ii) a plug removably positioned on said orifice of said threaded nipple;

(iii) a cap screwed onto said threaded nipple and operably arranged with said plug and said nipple such that said plug is forced against and closes said orifice whereby a user is able to position each said bag into a respective one of said second voids when said bag is deflated and then inflate said bag through said valve means thereby securing said cargo positioned on one of said pairs of pallets and afterwards unscrew said plug and to release said plug and deflate said bag through said nipple of said air release means and remove said cargo.

3. An expandable brace for placing across a void between cargo in a cargo space and a wall of said cargo space such as to secure said cargo from movement in said cargo space, said expandable brace comprising:

a first block with a first surface and a second surface opposite said first surface;

a second block having a first surface opposite a second surface with said first surface having an elongated hole;

a threaded shaft having one end secured to said first surface of said first block and extending away from said first surface of said first block;

said threaded shaft having another end slidably extending into said elongated hole in said first surface of said second block;

a nut having a threaded hole;

said second block having a slot intermediate said first and second surfaces of said second block with said nut positioned in said slot such that said another end of said threaded shaft inserted into said elongated hole in said second block is threaded into said threaded hole in said nut whereby said another end of said threaded shaft is adjustably retained in said elongated hole;

said nut, slot and threaded shaft being operably arranged such that a length of said brace between said first and second blocks is adjustable so that each expandable braces is positionable in said void having a first size with one of said first and second blocks positioned against said cargo wall and the other one of said first and second blocks positioned against said cargo such as to maintain position of said cargo on pallets between said walls of said cargo space.

4. The brace of claim 3 wherein said threaded shaft has a cylindrical threaded surface and a pair of opposing flat surfaces formed on said cylindrical threaded surface and said threaded hole in said nut has two opposing flat surfaces such that said nut threaded onto said threaded rod is conveniently positionable by rotating said nut to a position where said flat surfaces of said shaft and nut are all parallel to one another permitting a user to slide said nut on said threaded shaft for quick positioning of said nut.

5. A cushion placable in a space between cargo and a wall of a cargo space for first securing said cargo in position in said space then releasing said cargo for removal from said cargo space, said cushion comprising:

an inflatable bag;

a valve means adapted for admitting air into said bag;

a threaded nipple formed in a wall of said bag;

said nipple having an orifice such that an inside of said bag communicates with an outside of said bag;

a plug removably positioned on said office of said threaded nipple;

a cap screwed onto said threaded nipple such as to secure said plug on said orifice and operably arranged with said plug and said nipple such that when said plug is screwed onto said nipple and closes said orifice and said bag is deflated, a user is able to position said bag into said space and then inflate said bag through said valve means thereby securing said cargo in said space and afterwards unscrew said cap to release said plug and deflate said bag through said nipple whereby said cargo is released for removal.

6. The cushion of claim 5 wherein said inflatable bag is made from a sheet of material selected from the group of materials that consist of polyethylene, polyvinyl chloride, polyurethane and polypropylene.

* * * * *